L. ZAJAC.
PIPE THREADING MACHINE.
APPLICATION FILED JAN. 3, 1919.

1,349,646.

Patented Aug. 17, 1920.
5 SHEETS—SHEET 1.

INVENTOR
Leopold Zajac
BY
Pierre Barnes
ATTORNEY

INVENTOR
Leopold Zajac
BY
Pierre Barnes
ATTORNEY

L. ZAJAC.
PIPE THREADING MACHINE.
APPLICATION FILED JAN. 3, 1919.
1,349,646.
Patented Aug. 17, 1920.
5 SHEETS—SHEET 4.
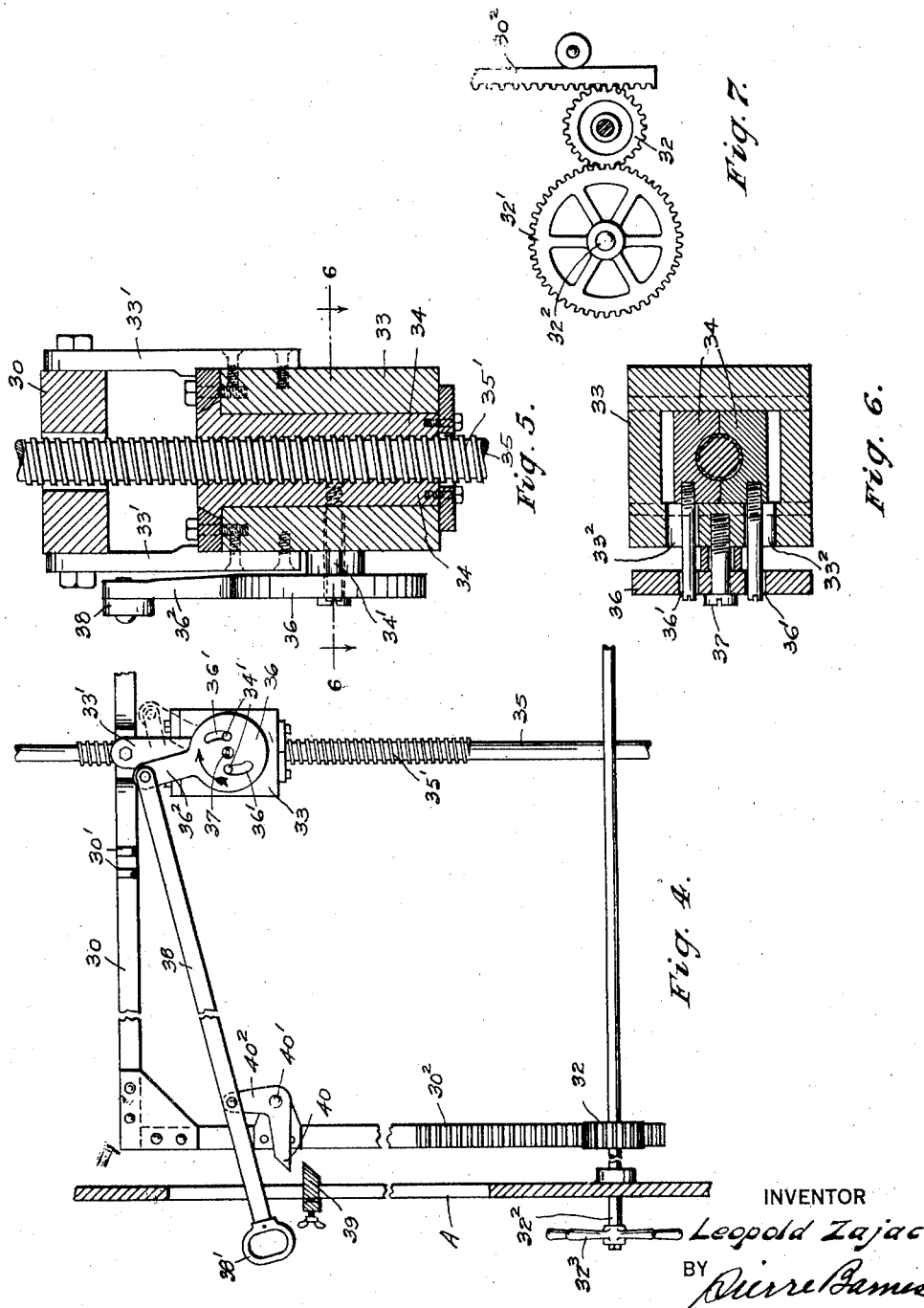
INVENTOR
Leopold Zajac
BY
*Pierre Barnes*
ATTORNEY L. ZAJAC.
PIPE THREADING MACHINE.
APPLICATION FILED JAN. 3, 1919.
1,349,646.
Patented Aug. 17, 1920.
5 SHEETS—SHEET 5.
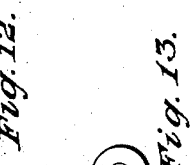
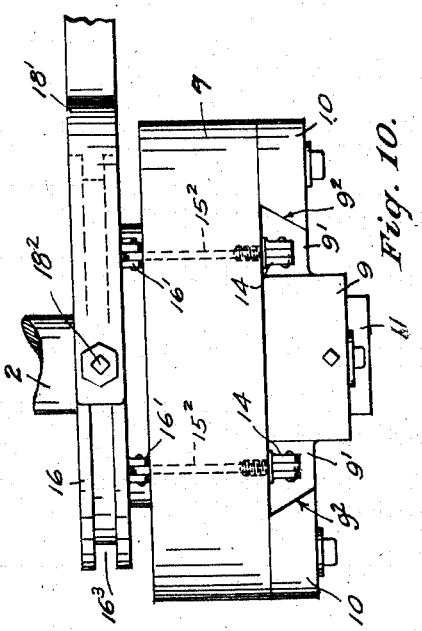
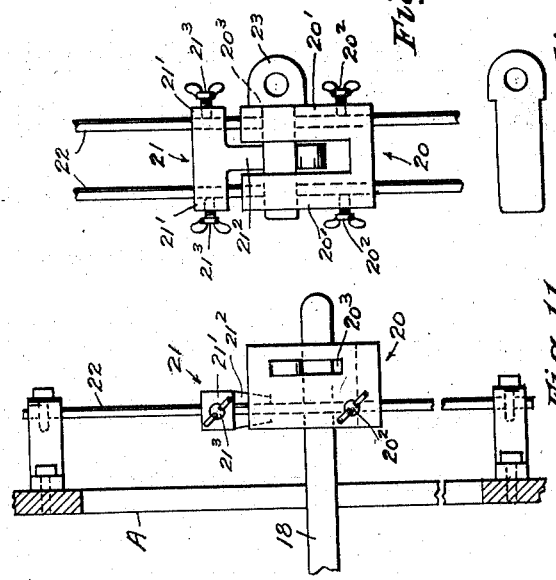
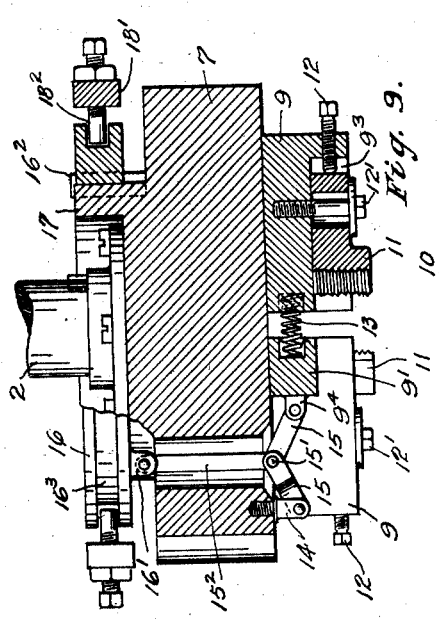
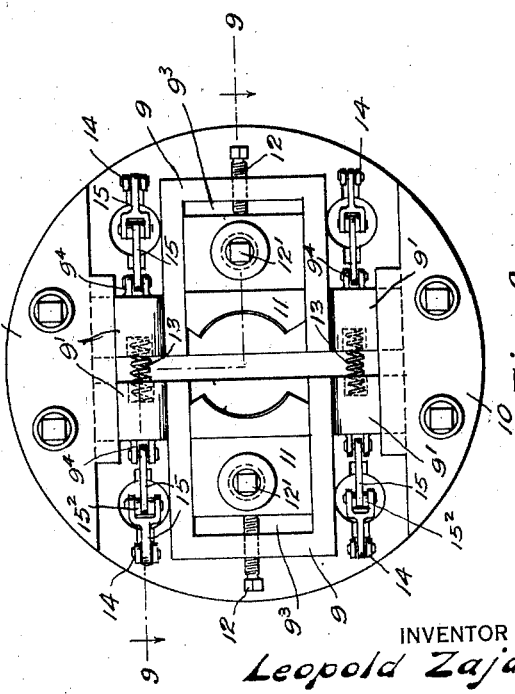
INVENTOR
Leopold Zajac
BY
Pierre Barnes
ATTORNEY

UNITED STATES PATENT OFFICE.

LEOPOLD ZAJAC, OF SEATTLE, WASHINGTON.

PIPE-THREADING MACHINE.

1,349,646.  Specification of Letters Patent.  Patented Aug. 17, 1920.

Application filed January 3, 1919. Serial No. 269,405.

*To all whom it may concern:*

Be it known that I, LEOPOLD ZAJAC, a citizen of the United States, residing at Seattle, in the county of King and State of Washington, have invented certain new and useful Improvements in Pipe-Threading Machines, of which the following is a specification.

This invention relates to pipe-threading machines, and, more especially, to those for cutting screw threads on both ends of short lengths of pipes or nipples.

The invention has for its objects—first, to provide a machine of this type whereby a plurality of nipples may be coincidently threaded; second, to provide means for adjusting the cutters to different lengths and diameters of nipples; third, to cut the threads to selected lengths; and, fourth, to provide means to facilitate the engagement and release of the nipples in the machine prior and subsequent to the threading operation.

I attain these and other objects by the devices illustrated in the accompanying drawings, in which—

Figure 1:
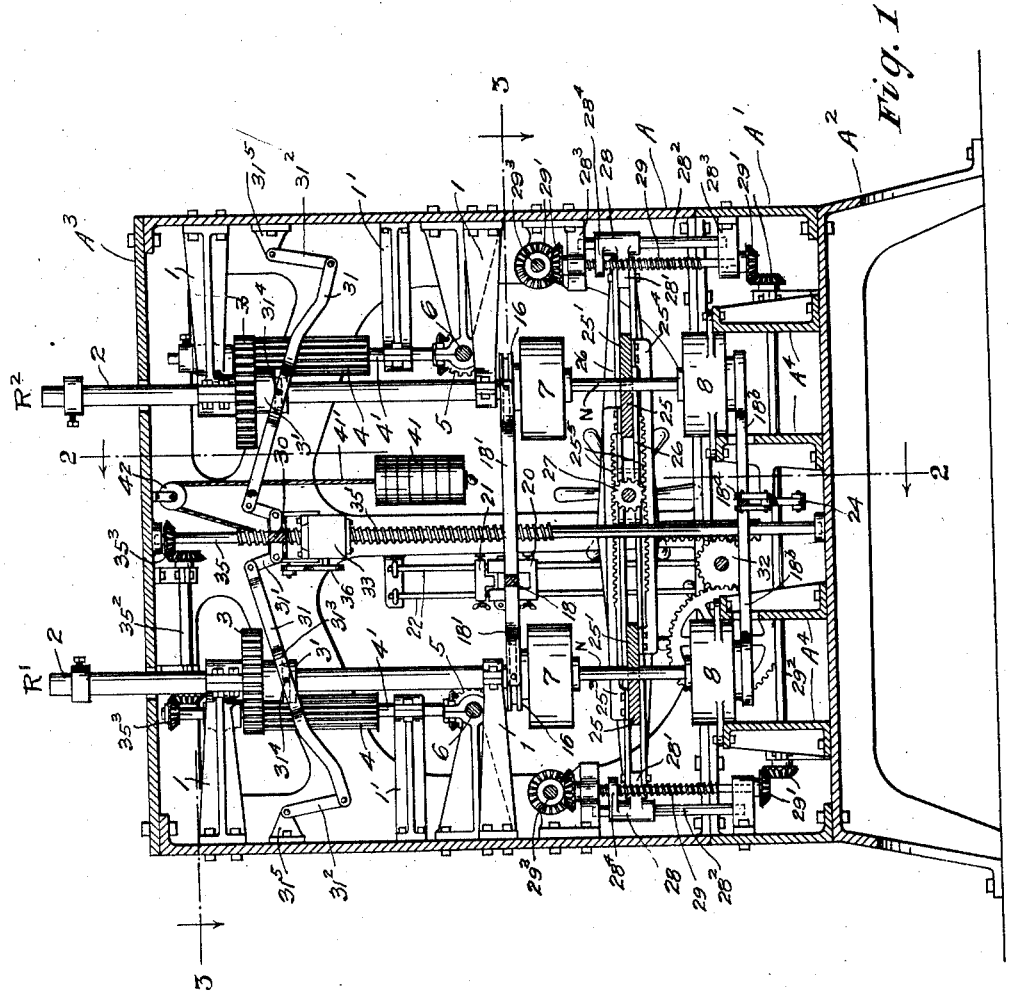
Figure 2:
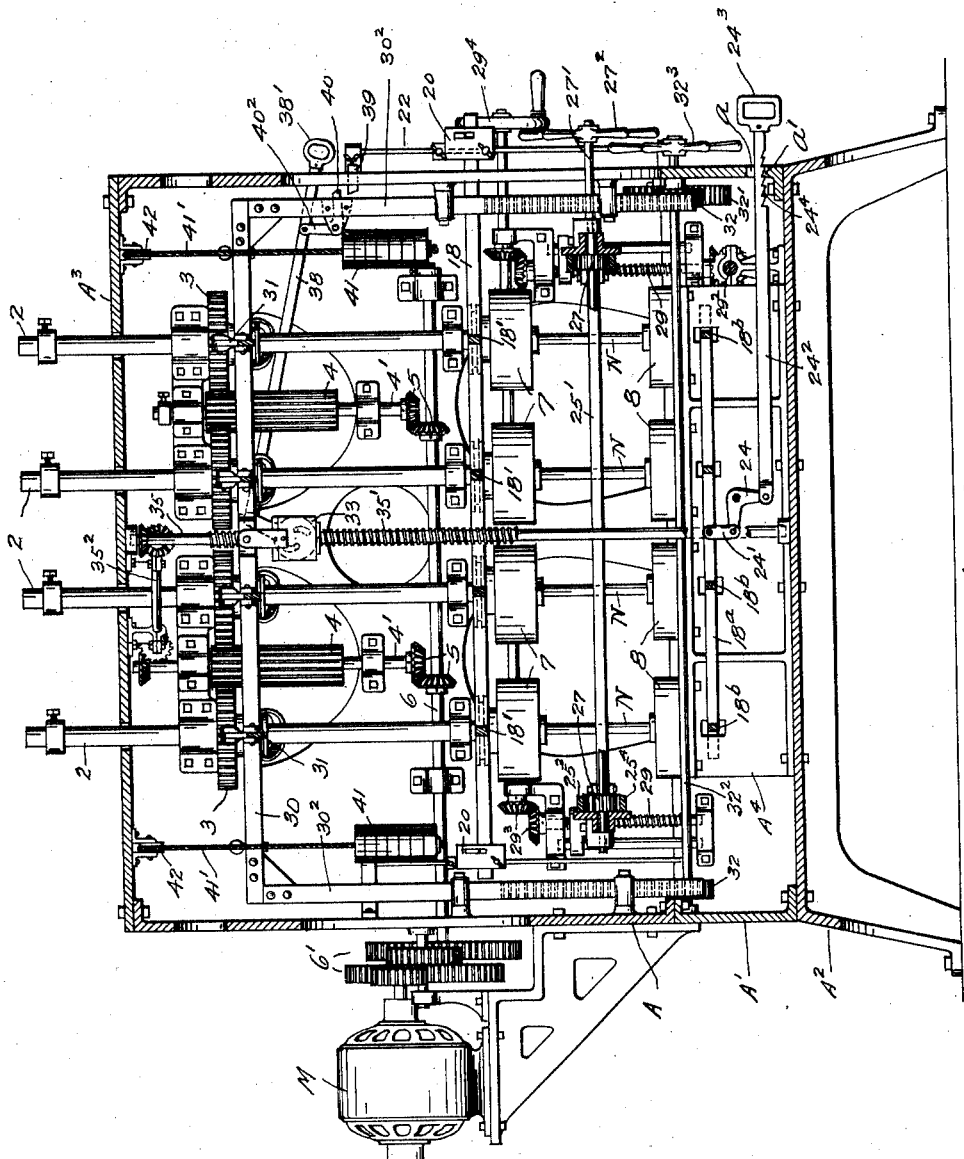
Figure 3:
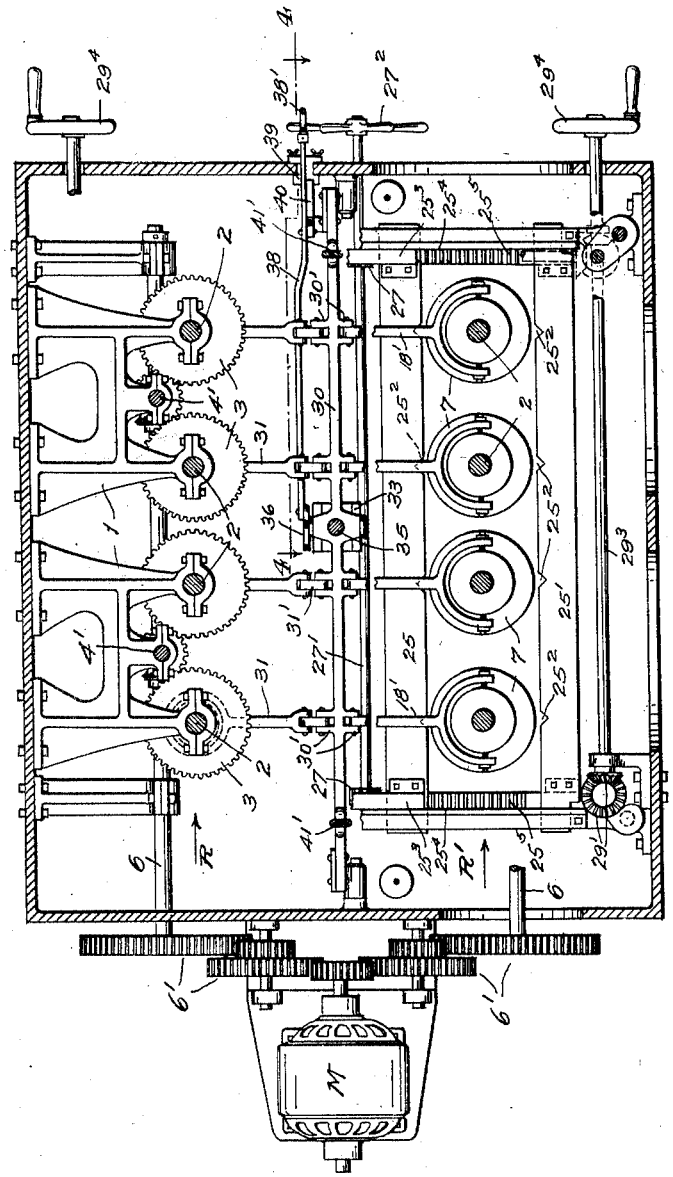

Figure 1 is a transverse vertical sectional view of a machine embodying my invention. Fig. 2 is a longitudinal vertical section through 2—2 of Fig. 1. Fig. 3 is a horizontal section through planes denoted by 3—3 in Fig. 1. Fig. 4 is a detail sectional view through 4—4 of Fig. 3. Fig. 5 is a transverse vertical sectional view taken through the feed screw clamping devices shown in Fig. 4. Fig. 6 is a horizontal section through 6—6 of Fig. 5. Fig. 7 is an end elevational view of a portion of the die elevator to illustrate the manually-controlled actuating gears therefor. Fig. 8 is an underside plan view of one of the upper die heads. Fig. 9 is a vertical section taken through 9—9 of Fig. 8. Fig. 10 is a side elevation of the head shown in Figs. 8 and 9. Fig. 11 is a detail sectional view of devices provided on the machine for regulating the vertical movements of the dies for the rotary heads. Fig. 12 is an end elevation of parts shown in Fig. 11. Fig. 13 is a detached elevational view of a gage key employed in adjusting the stop shown in Fig. 12.

Similar reference numerals designate corresponding parts throughout the various views.

The frame of my machine preferably consists of superposed sections A and $A^1$ supported upon a leg section $A^2$ and surmounted by a cover plate section $A^3$, the sections being secured together to afford a rigid structure.

Secured to or formed integral with said frame are bracket bearings 1 for a plurality of upright spindles 2, eight being shown in the drawings, arranged in two rows $R^1$, and $R^2$, Figs. 1 and 3. These spindles are arranged for both rotary and vertical axial movements in said bearings. Fixedly mounted on each spindle 2 is a spur gear wheel 3 meshing with relatively long spur pinions 4 mounted on upright shafts $4^1$ which are journaled in frame boxes $1^1$ whereby said spindles are rotated in unison. The shafts $4^1$ are driven by bevel gears 5 from horizontal shafts 6 which, in turn, are driven by suitable power means as, for example, an electric motor M through the medium of trains of gears $6^1$ from the motor armature shaft.

Secured to the lower end of each of the spindles 2 is a cylindrical body 7, hereinafter designated as an upper head, and opposing an axially alined similar body 8, hereinafter designated as a lower head. Said upper heads rotate with the respective spindles, while the lower heads 8 are secured from rotating to frame standards $A^4$ secured to and forming a part of the machine frame.

As best shown in Figs. 8, 9 and 10, a head has mounted on its end two boxes 9 having wing elements $9^1$ provided with inclined faces $9^2$ (Fig. 10) engaging against inclined faces of guide strips 10 secured to the respective heads to afford radial reciprocatory movements to the boxes 9. The boxes 9 are recessed, as at $9^3$, to accommodate complementary screw-thread cutters or die members 11, the same being adjustably moved by thrust screws 12 and secured in regulated positions with respect to the associated boxes 9 by means of clamping screws $12^1$.

13 represent helical springs interposed between the complementary die members 11 and tending to yieldingly press the latter asunder.

Connecting lugs $9^4$, which are provided on the outer sides of box wings $9^1$, and posts 14 secured to the head, are pairs of toggle links 15 connected from their joint pins $15^1$ with rods $15^2$ to lugs $16^1$ provided on collars 16, one for each head, which are connected for axial movements by means of splines $16^2$ (Fig. 9) to the hubs 17 of the respective heads. Said toggle links are arranged so that a movement of its collar downwardly with respect to an upper head 7 and upwardly with respect to a lower head 8 will serve to move the complementary members of a die toward each other, and oppositely directed movements of the collars will cause the members to be drawn apart. The collars of all of the upper heads 7 are connected with each other for coincident vertical movements by a controlling bar 18 extending longitudinally of the frame and having forked branch arms $18^1$ from the bifurcations of which studs $18^2$ extend into peripheral grooves $16^3$ provided in the respective collars 16.

Coöperating with said controlling bar at each end of the machine are stops 20 and 21 designed to be encountered by the bar in the upward and downward travel of the bar with the heads 7, thereby interrupting the travel of the bar during the ultimate movements of the referred-to heads for the purpose of closing the dies thereof as the associated heads ascend, and opening the dies at the termination of their descending movements.

The lower stops 20 are desirably each of a U-shape (Figs. 11 and 12), the branches $20^1$ thereof being bored to slidably fit upon a pair of rods 22 attached to the frame and to which a referred-to stop is secured at a predetermined elevation by set screws $20^2$. The branches $20^1$ of a stop, moreover, are provided with transverse slots $20^3$ for a gage 23 of a thickness corresponding to the lengths of the portions of the nippers which are to be threaded by the dies of the upper heads 7. The stops 20 serve to arrest the downward movements of the bar 18 and the upward movements of the bar are arrested by the above-mentioned stops 21, whereby the bar is influenced to respectively close and open the various dies.

Each of the upper stops 21 is of a substantially T-shape having bored branches $21^1$ through which pass the respective rods 22 and with its depending stem $21^2$ adapted to extend, if required, into the space between the branches $20^1$ of the adjacent stop 20, as illustrated in Fig. 12.

$21^3$ represent set screws for securing the stops 21 in adjusted positions to the rods 22.

The collars 16 of the lower heads 8 are, like those of the upper heads, connected by a controlling bar $18^a$ having arms $18^b$ for actuating the toggles of the respective dies. The lower controlling bar $18^a$ is, however, desirably elevated to close such dies by manually actuated appliances which, as shown, consist in a bell-crank lever 24 (Figs. 1 and 2) having one of its arms connected by links $24^1$ to the controlling bar and its other arm connected to an operating rod $24^2$ extending through an opening in an end of the frame, and terminating in a looped handle $24^3$. Said operating rod is formed with teeth $24^4$ engageable with a tooth $a^1$ provided at the lower edge of the frame opening $a$ for releasably securing the dies in their operative positions.

To open the dies, the operator disengages the rod $24^2$ from the tooth $a^1$ and pulls such rod outwardly supplemented by the weight of the bar $18^a$ to lower the latter.

The work or nipples, indicated by letters N in Figs. 1 and 2, are successively placed in upright positions, between the complementary jaws 25 and $25^1$ of vises and supported upon the dies of the lower heads. The nipples are thereupon clamped, as shown in Fig. 1, by said vise jaws, a pair for each row $R^1$ and $R^2$, said jaws having notches such as $25^2$ (Fig. 3) within which the several nipples are grasped.

The jaws are slidably mounted for movements toward and from the plane of the axes of the adjacent heads between spaced guide bars 26, Fig. 1. The jaws 25 and $25^1$ of one vise are coupled to the similarly designated jaws of the other vise by bars $25^3$ and $25^4$ disposed above and below the respective jaws, and are provided in their lower and upper edges, respectively, with rack teeth $25^5$.

27 represent spur pinions engaging the rack teeth $25^5$ and mounted on a shaft $27^1$ having a manually operating wheel $27^2$ on its end outside of the frame. The guide bars 26 have their ends rigidly secured to lugs $28^1$ of blocks 28 which are movable vertically on guide posts $28^2$ fixedly secured to brackets $28^3$ of the machine frame. The blocks 28 are also provided with internally threaded apertured lugs $28^4$ in which are engaged the threads of upright screw shafts 29 operatively connected by bevel gears $29^1$ with transverse shafts $29^2$ and also with a longitudinal shaft $29^3$ each having an operating wheel $29^4$ outside of the frame.

By manipulating the vise jaws through the instrumentality of either of the operating wheels $29^4$ the vises may be brought to an elevation approximately midway between the upper and lower heads 7 and 8 for the purpose of grasping nipples to temporarily hold the same from rotating during the early part of the thread-cutting operations unless the nipples to be threaded are what are conventionally denominated as "close" or "short," in which case the vises are not employed and the vise jaws are separated as in Fig. 3 to afford space therebetween for the lowering of the upper heads 7 into proximity of the lower heads 8.

Included in the invention are means operated manually or by power, selectively, for raising and lowering the upper heads 7 for the purposes of locating them in operative positions and to provide feed travel during the nipple threading operation.

The above-referred-to means comprises a vertically movable elevator formed of a horizontal bar 30 provided with laterally extending lugs 30¹ and rack members 30² depending from the ends of the bar 30. Said lugs are spaced to be opposite the respective spindles 2 and for each of the latter is provided a lever 31 (see Fig. 1) connected from their opposite ends by links 31¹ and 31² to the bar lugs 30¹ and to attachments 31⁵ on the frame.

The levers 31 are formed intermediate their lengths with an apertured portion 31³ inclosing the hub elements 3¹ of the aforementioned spur wheels 3. Said hub elements are each provided with a circumferential groove into which protrude studs 31⁴ provided on the respective levers so that as the latter are swung upwardly or downwardly with the elevator, the spur gears 3 and the spindles 2 to which they are secured are moved correspondingly.

To raise or lower the spindles by manual power, I employ spur pinions 32 engaging in the elevator rack members 30², said pinions being rotated by spur gears 32¹ mounted on a shaft 32² having a hand wheel 32³ within convenient reach of the operator.

The power-actuating devices for the elevator consist in a casing 33 connected by ears 33¹ to the elevator bar 30 and containing a nut formed of two separable members 34. Said nut is engageable with screwthreads 35¹ provided on an upright shaft 35 which is rotated continuously during the operation of the machine through the medium of an intermediate shaft 35² and bevel gears 35³ from one of the shafts 4¹.

The nut members 34 are provided with stud elements 34¹ extending through horizontal slots 33² (Fig. 6) of casing 33 into eccentrically disposed arcuate slots 36¹ of a cam plate 36 connected to said casing by a pivotal pin 37. Said cam slots are arranged to open the nut when the plate 36 is rotatably moved in the direction indicated by arrow in Fig. 4 and when the plate is turned in the opposite direction the nut is closed into engaging relations with the screw threads 35¹.

To manually effect the closing movements of said nut the plate 36 is provided with an arm 36² which is connected to an end of an operating rod 38 having a handle 38¹ outside of the frame. The opening movements of the nut may likewise be manually performed by the rod 38, but is preferably accomplished automatically as by means of a vertically adjustable tripping device 39 attached to the machine frame in the vertical path of the arm 40 of a bell-crank lever which is fulcrumed at 40¹ to the elevator, and has its other arm 40² connected to the aforesaid operating arm 38.

41 represent weights suspending from the ends of cables 41¹ passing over pulleys 42 and having their other ends connected to the elevator 30 for raising the same and attached parts after the die members of the upper heads are separated from nipples which have been threaded thereby.

For operation, the nipples N are first inserted between and clamped by the vise jaws, as hereinbefore explained, so that the lower extremities of the nipples will extend into the chamfered upper ends of the lower die members. The upper die members are thereupon brought into juxtaposition with the upper ends of the nipples through the medium of the spindles 2, levers 31 and the elevator which at this stage is lowered by means of pinions 32 acting through the elevator rack members 30² through the instrumentality of the hand wheel 32³.

With the upper die members thus brought into contact with the nipples, the operator raises the stops 20 to have their branches 20¹ at opposite sides of ends of the controlling bar 18, whereupon a gage 23 of suitable thickness is inserted in each stop 20 above said bar and the stops then lowered to present the under surfaces of said gages against the upper surface of the controlling bar at both ends of the machine. The stops 20 are then secured by set screws 20² to the frame rods 22.

The gages 23 are now removed and the stops 21 are adjusted at a predetermined elevation at which the bar 18 will encounter the same, or at distances above the upper ends of the nipples at which it is desired to have the upper die members close prior to the second and succeeding cycles of operation where a greater quantity of nipples of the same lengths are to be threaded than can be accomplished in a single operation.

In the case of nipples of large diameters— say two inches and upward—the trip 39 (Figs. 2 and 4) is secured at a short distance as, for example, one-half of an inch below the arm 40 of the bell-crank lever 40—40² which is attached to the elevator, and while the latter remains in the position which it occupies when the stops 20 are adjusted.

With the machine thus regulated for pipe nipples of larger diameters and with the nipples clamped by the vise jaws 25, 25¹, the operator by means of the rod 38 influences the cam plate 36 to close the nut members 34 about the screw shaft 35, whereby the latter in rotating effects the downward movement of the casing 33 together with the elevator 30, resulting in a feeding motion being imparted to the various upper heads while they rotate with the respective spindle.

By such devices, and by reason of the nipples being temporarily clamped in the vises, the dies on the upper heads will cut threads on the upper ends of the pipe. After the cutting has progressed for a short distance, the bell-crank lever 40—40² engages and is influenced by the trip 39 to disengage the nut 34 from the feed screw 35, and the threaded portion on the various nipples will thereupon serve to continue the downward or feeding movements of the upper dies.

After continuing the cutting of the threads on the upper ends of the nipples, the operator suitably turning a hand wheel 27², disengages the vise jaws 25, 25¹ from the nipples, resulting in their then rotating with the upper heads which in descending feeds the lower ends of the nipples into the non-rotating lower dies to be threaded thereby until the downward movements of the upper heads and dies are interrupted.

This is attained by the controlling bar 18 striking the stops 20 in the downward travel of the elevator, and affords an upward movement to the controlling bar with respect to the elevator with a consequent opening of the upper dies by reason of the bar arms 18¹ elevating the collars 16 of such upper heads to accordingly actuate the toggle links 15. When this occurs, the weights 41 assert their power to raise with the elevator the spindles 2, upper heads and dies until the elevator is stopped by the controlling bar 18 encountering the stops 21.

The last named stops, acting through bar 18, also serve to push down with respect to the upper heads the respective collars 16, thereby closing the dies of the upper head.

The lower dies are opened by the operator releasing and pulling outwardly the rod 24² to effect a downward movement to the bar 18ᵃ to which the lower die members are operatively connected. The nipples are then removed from the machine and replaced by others which are clamped in the vises to be threaded as above described.

Pipe nipples of less than two inches in diameter are threaded without the use of the feed screw 35, the nut 34 being in disengaged relations therewith and the feed being attained by the operator actuating the elevator which carries the spindles, upper dies, etc. through the medium of the pinions 32 operated from hand-wheel 32³. The construction and operation of my improved pipe threading machine will, it is thought, be understood from the foregoing.

What I claim, is—

1. In a pipe threading machine, the combination of a non-rotatable die, a rotatable die arranged for axial movements, and means for holding the work against rotation during the early part of the thread-cutting operation by the rotatable die, and means to disengage said means from the work whereby the same is rotated by said rotatable die while being threaded by both of said dies.

2. In a pipe threading machine, the combination of a non-rotatable die, a rotatable die in axial alinement therewith, means to rotate the second named die, means to impart axial movements to one of said dies, and devices operable between said dies for releasably engaging the work whereby the rotatable die is caused to successively operate upon the work independently of and in unison with the non-rotatable die.

3. In a pipe threading machine, the combination of a non-rotatable head, an adjustable die thereon, manually actuated means for opening and closing said die, a rotatable head disposed in axial alinement with the aforesaid head, an adjustable die on the second-named head, means for manually opening and closing the last named die, means for rotating the second named head, and means to impart axial movements to the latter toward and from the first-named head.

4. In a pipe threading machine, the combination of a rotary die arranged for axial movements, a non-rotary die in axial alinement with the aforesaid die, work-clamping jaws, means to close and open said jaws with respect to the work whereby the latter is first held to be operated upon by the rotary-die and then released so that the work can be rotated by the rotary-die to enable the non-rotary die to become operative.

5. In a pipe threading machine, the combination of a fixed head and a rotatable head, screw dies provided on said heads, means to adjust the position of said rotatable head with respect to said fixed head, means to temporarily hold the work between the dies of the respective heads, means to effect a feeding movement to the rotary head to cause the die thereof to engage one end of the work for rotating the latter subsequent to the release of the same from said work-holding means whereby the rotation of the upper head will effect the cutting of threads by the respective dies upon both ends of the work.

6. In a pipe threading machine, a plurality of upright spindles, means to rotate said spindles in unison, an elevator, power and hand actuated devices adapted to be used selectively for effecting the axial movements of said elevator, operative connections between said elevator and the spindles for raising and lowering the same coincidently with the elevator, a head secured to the lower end of each of said spindles, a plurality of fixed heads arranged in opposing relation with the aforesaid heads, and screw-cutting dies provided on the respective heads.

7. In a pipe threading machine, a plurality of upright spindles, means to rotate said spindles in unison, an elevator, gravity actuated means tending to raise said elevator, power and hand actuated devices adapted to be used selectively for effecting the downward movements of said elevator, operative connections between said elevator and the spindles for raising and lowering the same coincidently with the elevator, a head secured to the lower end of each of said spindles, a plurality of fixed heads arranged in opposing relation with the aforesaid heads, screw-cutting dies provided on the respective heads, and means for controlling the vertical travel of the first-named heads whereby the lengths of the screw threads cut by said dies upon the opposite ends of the pipe may be regulated.

8. In a pipe threading machine, a plurality of spindles, arranged for axial and rotary movements, a head secured to one end of each of said spindles, an elevator connected to said spindles for movements axially of the latter, a plurality of fixed heads, screw-cutting dies provided on said heads, a feed screw, means to releasably couple said elevator to the feed screw to effect axial movements to said spindles, a controlling device for regulating said means, and adjustable means adapted to influence said device whereby the latter is actuated to cause said means to become temporarily inoperative.

9. In a pipe threading machine, a fixed head, a rotary head arranged in opposing axial relations with respect to said fixed head, means to impart axial movements to said rotary head, screw-cutting dies provided on the opposing faces of said heads, said dies each comprising complementary members movable toward and from each other diametrically of the respective heads, adjustable means actuated by the axial movements of the rotary head for regulating the die members thereof, and manually operated means for regulating the die members of said fixed head.

Signed at Seattle, Washington, this 28th day of December, 1918.

LEOPOLD ZAJAC.

Witnesses:
 PIERRE BARNES,
 E. PETERSON.